United States Patent Office 3,504,983
Patented Apr. 7, 1970

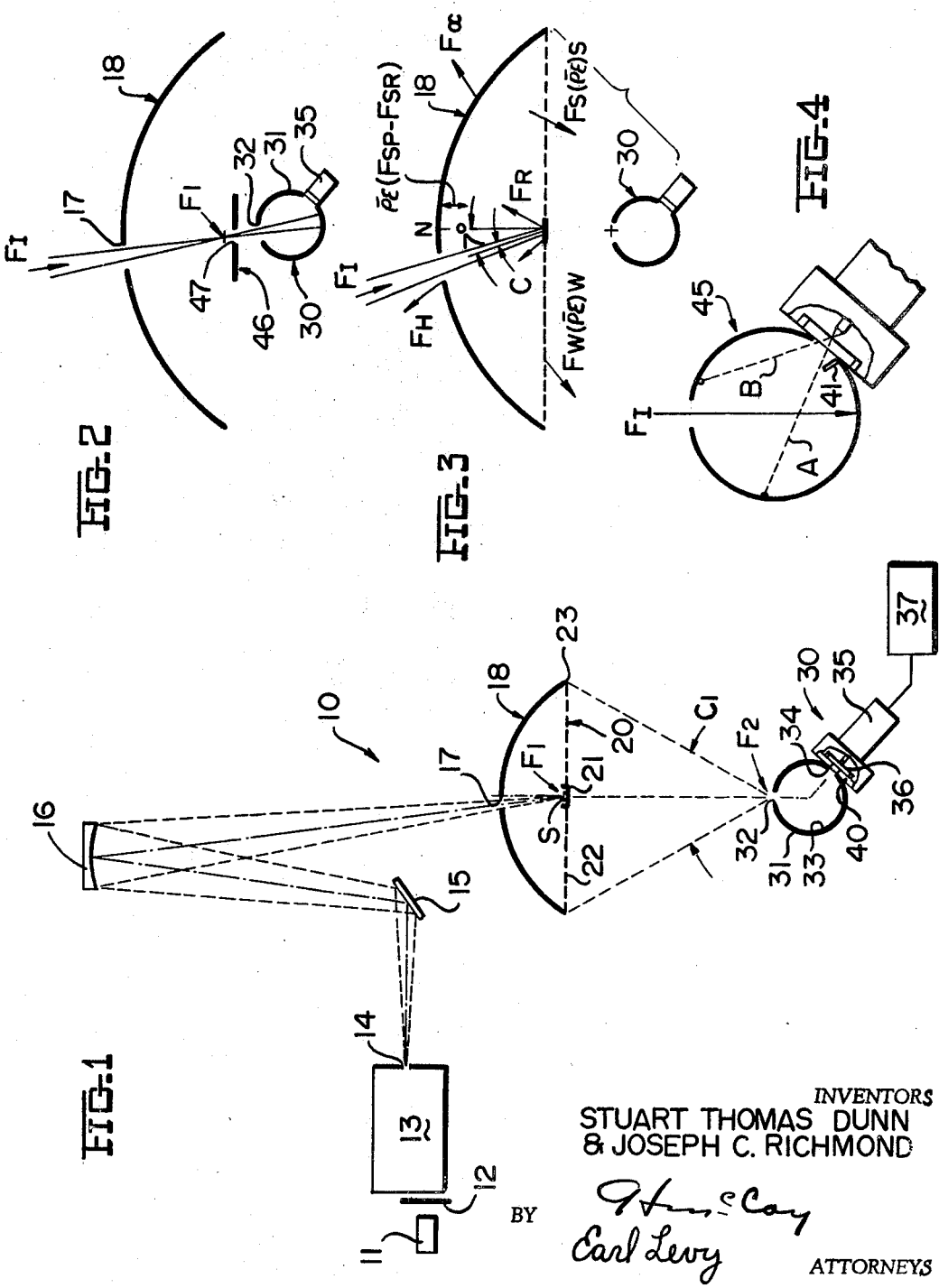

3,504,983
ELLIPSOIDAL MIRROR REFLECTOMETER INCLUDING MEANS FOR AVERAGING THE RADIATION REFLECTED FROM THE SAMPLE
Joseph C. Richmond, Chevy Chase, and Stuart Thomas Dunn, Silver Spring, Md., assignors to the United States of America as represented by the Administrator of the National Aeronautics and Space Administration
Filed May 31, 1966, Ser. No. 553,891
Int. Cl. G01n 21/45
U.S. Cl. 356—209           10 Claims

ABSTRACT OF THE DISCLOSURE

An ellipsoidal mirror reflectometer for measuring the reflectance of materials includes a source of monochromatic light, an ellipsoidal mirror reflector with an aperture therein, a specimen support position at the first focal point of said reflector, means for directing the monochromatic light through the aperture onto the support, and an averaging sphere detector positioned adjacent a second focal point of the reflector, the first and second focal points being on a common axis normal to the first focal plane of the reflector. A variety of shields are utilized with the reflectometer to provide a more accurate system and also to permit the determination of flux losses in the system.

---

The invention described herein was made by employees of the United States Government and may be manufactured and used by or for the Government for governmental purposes without the payment of any royalties thereon or therefor.

This invention relates to a novel apparatus for measuring the reflectance of materials, and it is particularly directed to a novel ellipsoidal mirror reflectometer which is highly versatile, accurate, and enables absolute or relative measurement of directional hemispherical, bidirectional, specular, non-specular and directional annular cone reflectance.

At present there exist several relatively basic instruments, with variations thereof, for measuring reflectance in the wave length range of 2.0 to 35μ. Two of these are the Coblentz hemisphere-type instruments, and the Gier-Dunkle cavity reflectometers.

The basic optical principle involved in the use of the Coblentz hemisphere reflectometer is the concept of conjugate focal points existing at approximately the center of curvature of a hemispherically-shaped reflector. Thus, if a sample is placed at the first conjugate focal point and illuminated by an appropriate monochromatic light source passing through an entrance aperture of the mirror, an enlarged image of the illuminated sample area appears at the second conjugate point. When this instrument is used to obtain absolute reflectance a detector is placed at the first conjugate focal point to read the incident flux, and then a sample is placed at the first conjugate focal point and the detector is placed at the second conjugate to measure the reflectance flux. The ratio of these two fluxes, corrected for system losses, is the directional hemispherical reflectance of the specimen. This is the absolute mode of operation, as compared to the comparison mode in which two measurements are made with the detector at the second conjugate focal point, one with a sample at the first conjugate focal point and the other with a standard at the first conjugate focal point.

The above discussed instruments include several disadvantages which prevent accurate measurements of the specimen reflectance as, for example, flux losses due to atmospheric absorption, losses of light passing out the entrance hole, mirror or reflector absorption, the inability of the detector to equally sense the flux from all directions over the hemisphere, etc. Furthermore, an undesirably large and ill-defined or distorted image is formed at the second conjugate focal point due to spherical aberration which requires the use of a large detector and results, in turn, in large errors due to the variations in sensitivity of the detector over its sensitive area.

If the specimen under examination and the comparison standard differ in distribution of reflected flux, losses due to detector angular and spatial sensitivity, entrance-hole losses, and mirror absorption are not proportional. This is particularly true of the entrance-hole loss which is very dependent upon the distribution of reflected flux. Further, detectors of such instruments are more sensitive to energy reflected from near the top of the hemisphere than to energy reflected from near the edge. An additional problem is the criticality of sample and detector locations, which, if not in the focal plane of the hemisphere, will yield large errors since much of the reflected flux will never reach the detector. The wavelength range of such instruments is also relatively limited (0.5 to 15μ) with a probable accuracy for any general engineering purpose of, at best, within 10 percent.

The heated cavity reflectometer offers a means of measuring directional hemispherical reflectance from 1 to 35μ with an accuracy of within approximately 5 percent for general engineering materials. The principle of this system is to place a specimen in a blackbody cavity (i.e., equal intensity from all directions) and thus illuminated diffusely. The specimen and a spot on the wall of the cavity are viewed alternately through a small aperture in the cavity, and a measurement of the incident and reflected flux is obtained to enable absolute reflectance measurement.

The major problems unique to such instruments which have not heretofore been resolved are the elimination of temperature gradients and hole effects so that the cavity is truly a blackbody cavity. Since the cavity is heated, the sample must be water-cooled and its temperature is difficult to control, except for samples of high thermal conductivity.

From the foregoing, it should be apparent that most conventional reflectometers possess many disadvantages which have not been thus far eliminated. Primary among the existing problems are:

(1) The effect of the entrance or exit hole on the measurement;

(2) The lack of versatility in the instruments which restricts them to measurements under specific conditions of illumination and viewing;

(3) The inability to define specifically the accuracy of measured reflectance;

(4) The necessity for a calibrated reflectance standard of known goniometric distribution of reflected flux; and (5) Spherical aberrations and/or detector spatial sensitivity problems.

The demand for exceedingly accurate and well defined reflectance data, well beyond that presently afforded by conventional reflectometers, has increased steadily and is presently intimately coupled with the space exploration program of this country where, for example, the basic problem of satellite temperature control has not been adequately solved. The most important controllable parameters in the solution of this problem are the thermal radiation properties of the satellite's surface, which can be determined from calculations based upon reflectance data of the particular material under consideration. At present, these calculations are, at best, estimates since existing reflectance data are generally considered to have 10 percent accuracy, and little or nothing is known about the goniometric distribution of the reflected or emitted flux from common engineering materials. Further, the effect on reflectance of roughness, surface contamination, surface damage and surface temperature cannot be predicted from existing experimental data obtained by conventional reflectometers.

It is, therefore, a primary object of this invention to provide a novel ellipsoidal mirror reflectometer which substantially eliminates and/or minimizes the heretofore noted and other disadvantages of conventional reflectometers due to the provision of an ellipsoidal mirror which reduces aberrations in the system by permitting measurements to be taken at true as opposed to conjugate focal points, an averaging sphere, which may be sulfur coated, associated with the detector for minimizing spatial and angular sensitivity, and a specimen support appreciably spaced from the detector which allows heating and cooling of the specimens over large temperature ranges without affecting the detector.

A further object of this invention is to provide a novel reflectometer which is not only operable in the infra-red portion of the spectrum, but is also operative in the visible and ultra violet portions of the spectrum, and includes an ellipsoidal reflector having a radiant flux entrance aperture, means for supporting a specimen at a first focal point of the reflector, means for directing radiant flux from a suitable source through the entrance aperture against a specimen supported upon the specimen supporting means, and detecting means at a second focal point of the ellipsoidal reflector for detecting the flux reflected from the reflector surface.

A further object of this invention is to provide a novel reflectometer of the type immediately heretofore described and including means disposed in the proximity of the first focal plane of the reflector for shielding undesired reflected radiant energy whereby accurate measurements of, for example, directional annular cone reflectance can be achieved with an efficiency permitting accurate data for calculating this reflectance.

Still another object of this invention is to provide a novel reflectometer including an ellipsoidal mirror having a radiant energy entrance aperture, means for supporting a specimen at a first focal point of the mirror, means for directing radiant flux from a radiation source through the entrance aperture against a specimen supported upon the supporting means, detecting means positioned at a second focal point of the mirror, and an apertured averaging sphere having an interior high-reflectance surface coating whereby spatial sensitivity is reduced and accurate detection of the flux is achieved.

Yet another object of this invention is to provide a novel reflectometer of the type immediately heretofore described wherein the flux energy reflected from the ellipsoidal mirror strikes the detector at an angle of preferably approximately 24 degrees but no greater than approximately 30 degrees thereby additionally eliminating errors resulting from spatial and angular sensitivity.

A further object of this invention is to provide a novel method of accurately measuring reflectance by providing a radiation source, directing radiant energy of the source through an entrance aperture of an ellipsoidal mirror and against a specimen whereby radiant energy is reflected from the specimen against a reflecting surface of the mirror, and directing the radiant flux or energy reflected from the mirror to a detector at a half-angle of impingement of no greater than approximately 30 degrees, and preferably approximately 24 degrees.

In the drawing:

FIGURE 1 is a schematic side elevational view of a novel ellipsoidal mirror reflectometer constructed in accordance with this invention, and illustrates a specimen supported at a first focal point of an ellipsoidal mirror and a detector positioned at a second focal point of the mirror.

FIGURE 2 is a highly schematic side elevational view of the ellipsoidal mirror and detector of FIGURE 1, and illustrates the detector positioned adjacent the first focal point of the mirror and a shield disposed between a light-entrance aperture of the mirror and the detector.

FIGURE 3 is a highly schematic side elevational view of the ellipsoidal mirror and detector of FIGURE 1, and diagrammatically illustrates the components of the total flux reflected by a specimen supported by a specimen support at the first focal point of the mirror.

FIGURE 4 is a highly schematic side elevational view of another averaging sphere constructed in accordance with this invention, and illustrates a shield adjacent to a detector aperture of the sphere.

Referring to FIGURE 1 of the drawings, a novel ellipsoidal mirror reflectometer constructed in accordance with this invention is generally designated by the reference numeral 10, and includes a conventional source of illumination 11, such as a Globar. The energy or flux from the source 11 is chopped by a chopper 12 (typical of which may be 11.3 c.p.s.) before entering a conventional monochromator 13. The monochromatic beam leaves the monochromator through a slit 14 and is then refocused by mirrors 15, 16, the former of which is an optically flat, front-surfaced aluminum mirror with no overcoat and the latter a spherical mirror of a 36-inched radius of curvature.

The refocused flux reflected by the mirror 16 is directed through a flux-entrance aperture or hole 17 in an ellipsoidal reflector or mirror 18 against a specimen S supported by support means 20 at a first focal point F1 of the mirror. The support means 20 includes a plurality of crossed thin strands 22 which are suitably secured to a peripheral edge 23 of the mirror 18, and a shallow box-like support 21 with normally disposed notches (unnumbered) which receive the strands 22.

The reflected flux from the specimen S is measured by detector means, generally designated by the reference numeral 30, suitably supported at a second focal point F2 of the ellipsoidal mirror 18. The detector means 30 includes an averaging sphere 31 having a flux-entrance aperture or hole 32 and an interior surface 33, preferably provided with a coating (not shown) which increases the ability of the sphere 31 to collect flux energy and to be relatively insensitive to small changes in image position.

The sphere 31 additionally includes an exit aperture 34 which is preferably disposed 135 degrees relative to the entrance aperture 32, adjacent to which is a detector 35 having a flux detecting head 36 connected to an electronic synchronous amplifier 37, such as a Brower Model 129 amplifier manufactured by Brower Laboratories, Inc., Turnpike Road, Westborough, Mass.

In an actual working embodiment of the reflectometer 10, the ellipsoidal mirror 18 was 12¼ inches in diameter and 3⅝ inches high with the first focal point F1 being in a plane of the peripheral edge 23 and the second focal point F2 positioned 17 inches below the first focal point F1. There are two support strands 22 which are relatively thin (0.010 inch) and cross each other at approximately the center of the mirror 18 in diametrical planes.

As was heretofore noted, the reflectometer 10 is constructed primarily for detecting flux in the infra-red portion of the spectrum which requires the use of the averaging sphere 31 to spread the available flux uniformly over the detecting head 36 of the detector 35 regardless of image size, shape, intensity distribution, etc. Heretofore, no means have been provided for producing satisfactory averaging spheres for use beyond $4\mu$. High sphere efficiency is particularly required in this invention because the amount of flux available for measurement is near the lower limit of the range of the detector, particularly at the longer and shorter wave lengths near 1.5 and $7.0\mu$. In accordance with this invention, the surface 33 of the averaging sphere 31 is preferably provided with a coating of m$\mu$ sulphur, but a roughened gold-plated surface has also been found acceptable. The following are six spheres which were constructed and determined acceptable for use with the reflectometer 10:

A four-inch diameter aluminum sphere coated with smoked MgO for use in the .25–3.0$\mu$ range. The size of the entrance and exit apertures 32, 34 were 0.188 square inch and 0.875 square inch, respectively.

A two-inch diameter sphere which was roughened by blasting the surface 33 with spherical glass shot. The sphere was then vapor-plated with an opaque coating of gold. The entrance and exit apertures were 0.44 square inch and 0.515 square inch, respectively.

A two-inch diameter sphere coated with Crystex sulphur furnished by the Stauffer Chemical Company, 380 Madison Ave., New York, N.Y. The analysis of this sulphur is 99.5% elemental sulphur, .10% ash, and the acidity is 0.05%. M$\mu$ (insoluble) sulphur comprises 90% of the elemental sulphur. This sulphur was hand pressed into a roughened inner surface of the sphere.

A two-inch diameter sphere roughened by blasting in the manner heretofore described and vapor-plated with an opaque coating of gold was thereafter over-coated with a coating of suphur. The sulphur was suspended in alcohol and sprayed against the inner surface of the sphere.

A two-inch diameter sphere was sprayed-coated to a thickness of ⅛ inch with an admixture of sulphur and alcohol.

A two-inch diameter sphere was spray-coated with a ⅛ inch thick coating of an admixture and sulphur and benzene.

The latter two listed averaging spheres were tested to determine the spatial sensitivity of the sphere, i.e., the variation response to the detector with changes in the illuminated portions of the sensing area of the detector head, and both spheres were found operative and reasonably efficient at the operating wave lengths of the reflectometer 10. The efficiency of averaging by the spheres was increased by the use of the shields 40, 41 (FIGURE 1 and FIGURE 4, respectively) the latter of which is associated with an averaging sphere 45. That is, the averaging spheres were made to be better averaging devices by the use of the shields 40, 41 which, while resulting in a reduction of the radiation collecting efficiency at the same time reduced the total error of the system by restricting the detector's field of view.

The shield 40 is a 0.15-inch thick disc spanning the aperture 34 and having a ½-inch diameter hole centered over the detecting head 36. The walls (unnumbered) defining the aperture 34 were covered with Parson's black and thus restrict the detector's field of view which is, for example, designated by the lines A, B in FIGURE 4.

The shield 41 (FIGURE 4) yields a higher detection efficiency than the shield 40 since it only restricts the effective viewing field in the direction of the image on the interior sphere wall or surface 33. The shield 41 is constructed of 0.005-inch thick polished platinum, and is positioned adjacent an exit aperture 43 in generally radially inwardly directed relationship to the averaging sphere 45.

The detecting head 36 of the detector 35 may be, for example, a Reeder ten junction thermopile having a sensing area of 1 cm.$^2$. However, other suitable detecting means may be employed, such as a balometer or similar detecting devices. The thermopile consists of ten plates (not shown) each approximately 2 mm. x 5 mm. in size arranged in two columns of five rows each to form a relatively sensitive area 1 cm. square. A thermcouple is attached to each plate and the ten thermocouples are connected in series to form the thermopile which is conventionally connected to the amplifier 37. This relatively large detecting area is required in the reflectometer 10 only in the absence of the averaging sphere 31 because the incident image (2 mm. x 2 mm.) is magnified about 25 times to a size of 1 cm. x 1 cm. at the second focal point F2.

Further, when the reflectometer 10 is used in the absolute mode, to be described more fully hereafter, it is necessary for the detector 35 to sense flux incident in a cone C (FIGURE 3) of 4 degrees half angle centered around a direction 7 degrees from the normal N over a 2 mm. x 2 mm. area equally as well as flux from a cone C1 (FIGURE 1) the normal having a 24 degree half angle and an image area of 1 cm. x 1 cm. When the reflectometer 10 is used in the relative mode, this is not as critical since the reflected beams are similar, depending upon the goniometric distribution of their reflected fluxes.

An absolute reflectance measurement is made by taking two basic measurements; one of the incident flux $F_I$ and the other of the reflected flux $F_R$ (FIGURES 2 and 3, respectively). To measure the incident flux $F_I$, the detector 35 is placed at (or near) the first focal point F1 of the mirror 18, in the manner clearly illustrated in FIGURE 2 of the drawings. A black shield or screen 46 having a hole 47 just large enough to admit the incident beam $F_I$ is positioned approximately 1½ inches above the aperture 32 of the averaging sphere 31. The purpose of the screen 46 is to prevent flux which is back-reflected by the aperture 32 to the mirror 18 from being re-reflected into the interior of the sphere 31, thereby otherwise increasing the flux in the sphere. The flux incident on the detecting head 36 is $F_{ID}=F_I\eta$ where $\eta$ is the efficiency of the averaging sphere (which for a given sphere configuration is a function of the sphere coating reflectance).

FIGURES 1 and 3 graphically illustrate the manner in which the reflected flux $F_R$ is detected by the reflectometer 10. The reflected flux $F_R$ (FIGURE 3) is equal to the sum of the flux absorbed by the mirror $F\alpha$, the flux lost through the entrance aperture 17 ($F_H$), the flux scattered and/or absorbed by the strands 22 of the support means 20 $(\bar{\rho}\epsilon)W\ F_W$ and the flux lost due to the shading of the detector by the sample $(\bar{\rho}\epsilon)[F_{SP}-F_{SR}]$. Thus, the total flux reflected by the specimen S is:

$$F_R = F_S + F_W + [F_{SP} - F_{SR}] + F_H$$

The above formula and the specific definitions of each of the noted fluxes as well as mathematical equations relative thereto are fully set forth in the publication entitled "Design and Analysis of an Ellipsoidal Mirror Reflectometer" by Stuart Thomas Dunn, published June 22, 1965, copies of which are available at the Graduate School of the Oklahoma State University. However, a brief description of the method of determining one of the latter-noted fluxes to eventually obtain a flux balance of the system will be described immediately hereafter.

FIGURE 3 of the drawings diagrammatically illustrates each of the latter-noted fluxes which are utilized to balance the reflected flux of the reflectometer 10. In accordance with this invention, shields of appropriate contours positioned in the vicinity of the first focal point F1, as in the case of the shield 46 of FIGURE 2, blocked out selected components of the reflected flux $F_R$ so that an accurate measure of absolute reflectance can be obtained by determining the ratio of the absolute reflected flux to the incident flux. For example, some of the flux reflected by the specimen S and reimaged by the ellipsoidal mirror 10 toward the second focal point F2 is absorbed or scattered and thus lost by the wire strands 22. The amount absorbed or scattered by the strands 22 is established by orienting the specimen support (strands 22) so that the specular component of reflection does not impinge against any of the strands 22. That is, only a part of the non-specular component of the reflected flux is blocked by the strands. Therefore, by constructing a shield to block out the flux about the specular component, a measurement of the non-specularly reflected flux can be obtained and the flux lost as a result of strand loss can be calculated in the manner set forth in the latter-noted publication. The particular configuration of each shield is also fully illustrated in the same publication.

After the reflectometer 10 has been corrected for system losses, the reflectance of the specimen S is determined by first measuring the incident flux by positioning the detector means 30 adjacent the first focal point F1, in the manner illustrated in FIGURE 2 of the drawings and described heretofore. The reflected flux is then measured by placing the detector means 30 at the second focal point F2 and the specimen S at the first focal point F1 (FIGURE 1). The monochromatic flux reflected by the mirror 16 is directed toward the speciment S in the cone C centered upon an axis 7 degrees from the normal N. The incident image of the specimen S upon the ellipsoidal mirror 18 is magnified approximately 25 times to a size of 1 cm. x 1 cm. at the second focal point F2 and is concentrated in the relatively small cone C1. After obtaining the reading by the detector means 30 and making corrections for flux losses as described in the previous paragraph, the ratio between the incident flux and the reflected flux is then calculated to determine the absolute reflectance of the specimen S.

The foregoing description was that of measuring the reflectance by the absolute mode of operation of the reflectometer 10, but a similar measurement of reflectance may be obtained by operating the reflectometer in the relative mode. In this case, the detecting means 30 is always positioned at the second focal point F2. One measurement is obtained by placing a specimen at the first focal point F1, and then a second measurement is obtained by placing a reflectance standard, such as a small calibrated aluminum mirror, at the first focal point F1. The ratio between these measurements results in a determination of the absolute reflectance of the particular specimen under test, with applicable corrections as outlined in the latter-noted publication. One advantage of this mode of operation is that a specularly reflecting comparison standard is used as the reference, and it is comparatively easy to calibrate such a standard to an accuracy of ± 0.001 in reflectance by a multiple reflection technique.

While a preferred embodiment of the invention has been heretofore described, it is to be understood that variations may be made therein within the scope of this invention. For example, the aperture 17 in the ellipsoidal mirror 18 may be eliminated and in lieu thereof radiant energy could be directed upwardly against the inner surface of the mirror, reflected toward the specimen S, and thereafter re-reflected by the mirror surface toward the second focal point F2. This could be accomplished by positioning a mirror in the flux path from the mirror 16 which reflects the flux energy to a rotatably adjustable mirror positioned beneath the peripheral edge 23 of the ellipsoidal mirror 18. This latter mirror could be appropriately adjusted to direct the flux against a selected area of the inner surface of the mirror 18 for desired impingement against the specimen S.

Irrespective of minor variations in the reflectometer 10, it is important to note that this invention is primarily concerned with the measurement of directional hemispherical reflectance which is the ratio of the flux reflected into a hemisphere above the specimen surface to that incident to the surface at a particular direction and in a small solid angle. The unique optics of the ellipsoidal mirror 18 allow accurate description of the distribution of the reflected flux because the spatial distribution of the reflected energy crossing the first focal plane F1 is related precisely to the goniometric distribution of the reflected flux. That is, every direction in the hemisphere above the specimen surface is represented by a particular point in the first focal plane, and every solid angle centered in this direction is represented by a particular area about this point. This allows the selection of energy that the detector views by blanking out unwanted energy with a shield placed in the first focal plane, in the manner heretofore described. With this procedure, a specular component can be measured which has a solid angle determined by the open area of the shield placed in the first focal plane. Similarly, the bi-directional reflectance may be measured by a similar procedure, i.e., by varying the position of a hole in an appropriately contoured shield. Measurement of the directional annular cone reflectance is accomplished through the use of a set of circular disks centered on the sample, which allow sufficient data for calculation of this reflectance. Further, this ability to measure the distribution of the reflected flux greatly aids in making precise corrections for the system losses, as was heretofore described and is more fully and completely disclosed in the latter-noted publication.

While preferred forms and arrangement of parts have been shown in illustrating the invention, it is to be clearly understood that various changes in details and arrangement of parts may be made without departing from the spirit and scope of the invention as defined in the appended claimed subject matter.

What is claimed is:

1. A reflectometer comprising an ellipsoidal reflector having a first and a second focal point; means for directing radiation toward the first focal point of the reflector substantially along a line joining the focal points; means for supporting, substantially perpendicular to the line joining said focal points, a test specimen at the first focal point, whereby the radiation impinges against the specimen on said means for supporting and is at least partially reflected thereby; and means for flux averaging and detecting positioned adjacent the second focal point of the reflector for averaging and detecting the reflected radiation of the specimen.

2. The reflectometer as defined in claim 1 wherein said means for flux averaging and detecting includes an averaging sphere and a detector, said averaging sphere having entrance aperture means adjacent said second focal point for admitting the reflected radiation into the interior thereof, and means placing said detector in radiation communication with the interior of said averaging sphere for detecting the reflected radiation therein.

3. The ellipsoidal reflectometer as defined in claim 1 wherein said reflecting surface is of a configuration which directs the reflected radiation toward the second focal point in a conical pattern having no more than approximately a 30 degree half angle.

4. The reflectometer as defined in claim 2 wherein said last-mentioned means includes a detecting aperture in said averaging sphere, and an apertured shield covers said aperture and restricts the field of view of said detecting means.

5. The reflectometer as defined in claim 2 wherein said last-mentioned means includes a detecting aperture in said averaging sphere, and a radially inwardly directed shield is positioned adjacent said aperture and controls the field of view of said detecting means.

6. The reflectometer as defined in claim 2 wherein said reflecting surface is of a configuration which directs the reflected radiation toward the second focal point in a conical pattern having approximately a 24 degree half angle.

7. A method of determining the reflected radiation of a specimen comprising the steps of positioning a specimen substantially perpendicular to a line joining a first and second focal point of an ellipsoidal reflector at the first focal point thereof, directing radiation toward and against the specimen whereby a portion of the radiation is reflected toward the second focal point of the reflector in a conical pattern having no more than approximately 30 degrees half angle, and flux averaging and detecting the reflected radiation at the second focal point.

8. The method as defined in claim 7 including the step of introducing the reflected portion of the radiation into an averaging sphere, and shielding some of the introduced radiation prior to detecting the remaining radiation.

9. A method of determining the absolute reflectance of a specimen comprising the steps of positioning a flux averaging and detecting means substantially perpendicular to a line joining a fiirst and a second focal point of an ellipsoidal reflector in the vicinity of the first focal point thereof; positioning an apertured shield between the reflector and said means; directing radiation through the reflector and the shield, substantially along the line joining the focal points, to said means to obtain a first reading of the incident radiation; repositioning said means at the second focal point of the reflector; removing said apertured shield; positioning a specimen substantially perpendicular to the line joining the focal points and substantially at the first focal point of the reflector; directing radiation toward and against the specimen whereby a portion of the radiation is reflected toward the second focal point of the reflector; and averaging and detecting the reflected radiation at the second focal point to obtain a second reading of the reflected radiation, whereby the ratio of the first and second readings are indicative of the absolute reflectance of the specimen.

10. A method of determining a particular radiation component incident of the balancing of a reflectometer system of the type including an ellipsoidal reflector, a specimen support located substantially perpendicular to a line joining a first and a second focal point of the reflector and adjacent the first focal point of the reflector for supporting a specimen, and a flux averaging and detecting means at the second focal point of the reflector comprising the steps of: positioning a shield capable of blocking out undesired radiation components of monochromatic radiation reflected from the specimen in close proximity to the specimen support, directing monochromatic radiation through the reflector substantially along the line joining the focal points toward the specimen whereby the undesired radiation reflected from the specimen is blocked by the shield and prevented from affecting said means while the desired radiation component is free to pass to said means, and flux averaging and detecting the desired radiation component at said means.

References Cited

UNITED STATES PATENTS

| 3,010,358 | 12/1961 | Siegler | 88—14 |
| 3,039,515 | 6/1962 | Figlio et al. | 350—87 X |
| 3,222,522 | 12/1965 | Birkebak | 88—14 |
| 3,277,773 | 10/1966 | White | 88—14 |

FOREIGN PATENTS 947,752  8/1956  Germany.

JEWELL H. PEDERSEN, Primary Examiner

O. B. CHEW, Assistant Examiner

U.S. Cl. X.R.

250—219